(12) United States Patent
Chüang et al.

(10) Patent No.: US 6,270,062 B1
(45) Date of Patent: Aug. 7, 2001

(54) FLUIDS CONTACTING, TRAY OPENING, FLUID DISPERSING ASSEMBLY

(75) Inventors: Karl T. Chüang, Edmonton (CA); Guo-Chang Pan, Beijing (CN)

(73) Assignee: AMT International, Inc., Richardson, TX (US)

( * ) Notice: Subject to any disclaimer, the term of this patent is extended or adjusted under 35 U.S.C. 154(b) by 0 days.

(21) Appl. No.: 09/504,291

(22) Filed: Feb. 15, 2000

Related U.S. Application Data

(62) Division of application No. 09/145,187, filed on Sep. 1, 1998, now Pat. No. 6,145,816.
(60) Provisional application No. 60/061,504, filed on Oct. 10, 1997.

(51) Int. Cl.$^7$ ...................................................... B01F 3/04
(52) U.S. Cl. ........................................................ 261/114.4
(58) Field of Search ............................. 261/114.1, 114.4, 261/114.5

(56) References Cited

U.S. PATENT DOCUMENTS

| | | | |
|---|---|---|---|
| 3,215,414 | 11/1965 | Van't Sant | 261/114.4 |
| 3,399,871 * | 9/1968 | Bon | 261/114.4 |
| 3,427,007 * | 2/1969 | Braun | 261/114.4 |
| 3,602,253 | 8/1971 | Bahout et al. | 261/114.4 |
| 3,747,905 | 7/1973 | Nutter | 261/114.1 |
| 3,815,880 | 6/1974 | Price | 261/114.4 |
| 4,118,446 | 10/1978 | Burin et al. | 261/114.4 |
| 4,225,541 | 9/1980 | Vaschuk et al. | 261/114.4 |
| 4,290,981 * | 9/1981 | Schramm | 261/114.4 |
| 4,344,900 | 8/1982 | Sonnedecker et al. | 261/114.4 |
| 5,911,922 * | 6/1999 | Hauser et al. | 261/114.4 |
| 6,053,485 * | 4/2000 | Pan et al. | 261/114.4 |
| 6,145,816 * | 11/2000 | Chuang et al. | 261/114.4 |

FOREIGN PATENT DOCUMENTS

| | | | |
|---|---|---|---|
| 342641 * | 6/1972 | (SU) | 261/114.4 |
| 345927 * | 7/1972 | (SU) | 261/114.4 |
| 766609 * | 9/1980 | (SU) | 261/114.4 |
| 1012939 * | 4/1983 | (SU) | 261/114.4 |

\* cited by examiner

*Primary Examiner*—C. Scott Bushey
(74) *Attorney, Agent, or Firm*—Baker Botts L.L.P.

(57) ABSTRACT

A fluids contacting and dispersing apparatus for a fluids contacting column is provided comprising a perforated cover plate, means for positioning the cover plate over a tray opening and securing it within the opening. Deflecting members span each perforation in the cover plate to prevent bleed fluid from shooting straight up and hitting the underside of the above tray. The deflecting members also provide a surface for dispersing lighter, finer bleed fluid flowing upwardly through the perforations over a central zone of the cover plate and into heavier fluid flowing across the tray in the path of the cover plate. The deflecting members direct lighter fluid into what would otherwise be a stagnant central zone of the cover plate. The cover plate is positioned over the tray opening by means of legs which are integral with the cover plate and are slidable within the tray opening. The fluid contacting and dispersing apparatus may be in a fixed, fluid dispersing and contacting assembly or in a movable, valve assembly that is displaced upwardly by the lighter fluid. The valve of the assembly provides finer exchange over a greater active area to increase efficiency and lower energy requirements.

4 Claims, 5 Drawing Sheets

FLUIDS CONTACTING, TRAY OPENING, FLUID DISPERSING ASSEMBLY

This application is a divisional of U.S. application Ser. No. 09/145,187 filed Sep. 1, 1998 now U.S. Pat. No. 6,145,816, by Karl T. Chuang and Guo-Chang Pan, entitled "FLUIDS CONTACTING, TRAY OPENING, FLUID DISPERSING ASSEMBLY," which is based on Provisional U.S. application Ser. No. 60/061,504 filed Oct. 10, 1997 now abandoned.

This is a non-provisional patent application based on Provisional Patent Application No. 60/061,504 filed Oct. 10, 1997.

This invention relates to a fluids contacting and dispersing apparatus and it particularly pertains to a novel valve assembly for use in fractionation columns and other related apparatus.

BACKGROUND OF THE INVENTION

In a typical installation, a number of horizontally oriented surfaces or trays are mounted in a sealed, vertically oriented vessel known in the industry as a column or tower. Each of the trays may contain numerous openings. A relatively heavier fluid is introduced on the upper surface of the uppermost tray deck. The introduction of this fluid at one end of the horizontal tray is referred to as the upstream end or portion. A crossflow forms as the fluid flows across from the upstream end of the tray to the downstream end or portion of each tray. At the downstream end of the tray is a weir which leads to a downcomer. The downcomer of an upper tray leads down to an unperforated upstream area or downcomer seal area on the next lower tray.

A lighter gas or fluid is introduced into the lower end of the column. As the heavier liquid or fluid flows across the tray surface, the lighter gas ascends through the openings in the trays and into the heavier liquid flowing across and above the surface of the tray. This creates a bubble or active area where there is intimate and active contact between the heavier and lighter fluids. Some columns utilize multiple sets of flow paths including a downcomer, active area and downcomer seal transition area for each section.

Many crossflow trays are simple sieve trays where the deck surface has hundreds of circular holes for contact between the fluids. However, a simple hole such as this type of aperture or opening allows for the lighter fluid to shoot straight up and hit the bottom of the above tray deck. This is commonly referred to as flooding and greatly decreases the efficiency and capacity of the entire column and may introduce impurities into the fractionation process.

To combat flooding, some trays have valves associated within the tray openings and others have fixed assemblies over the holes or apertures. The valves may have different configurations to deflect the rising gases. These valves rise upwardly and fall due to gravity by the introduction of fluid pressure from below the valve. However, while each valve deflects the vapor flow from shooting up and flooding the tray deck, each individual valve introduces a small area of blockage across the each aperture of the tray deck thereby reducing the interaction or exchange between the fluids. This small, central area above each valve is a stagnant zone or an inactive area where minimal mass transfer exchange occurs.

It has already been proposed in, for example, U.S. Pat. No. 4,118,446, dated Oct. 3, 1978, by Burin et al., (Col. 4, ll. 44–45), to provide perforations in upwardly movable valve cover plates, for tray openings, to eliminate stagnant zones in a mass exchange column containing valve trays at different heights therein. A relatively lighter fluid is fed into the column beneath the trays to flow upwardly through the openings, while heavier fluid is fed into the column above the trays. The heavier fluid gravitates down the column by passing across each tray while the lighter fluid ascends in the tray lifting the valve cover plates and causing intimate contact between the fluids. The Burin et al. perforations are provided to eliminate stagnant zones in the heavier fluid flowing immediately above the caps.

While the Burin et al. valve perforations to some extent eliminate stagnant zone, there is a problem in that bubbles from lighter fluid flowing upwardly from the perforations and through the stagnant zones tend to follow definite paths through the heavier fluid leaving portions of the stagnant areas undisturbed. Additionally, these types of perforations will allow the lighter gas carrying heavier liquid, commonly referred to as entrainment, to shoot straight up to the bottom of the upper tray thereby causing premature flooding and lowering the efficiency and capacity of the column.

U.S. Pat. No. 3,215,414, dated Nov. 2, 1965, by Van't Sant (col. 1, lines 48–51 and col. 3, lines 3–6), shows a valve cover plate having opposed recesses into which an arched guide band is clipped to extend over the valve cover plate and downwardly through the recesses to guide the valve during when it is lifted by upwardly flowing fluid. Partial closure of the valve allows minimum free passage of fluid between the cover plate and the tray at all times. While the guide band of Van't Sant is useful in providing the easily assembled, two part valve body that it was intended to do, any fluid escaping upwardly under the guide band will be minimal and will not be directed towards the central stagnant zone over the valve cover plate leaving this zone undisturbed.

There is a need for a fluids contacting, tray opening, fluid dispersing assembly, wherein fine or micro dispersion of the lighter fluid is achieved over the central portion of the cover plate, thus more effectively breaking up the stagnant zone above the individual valves and enhancing mass transfer between the fluids as well as increasing the column handling capacity and efficiency.

SUMMARY OF THE INVENTION

This invention relates to a fluids contacting and dispersing apparatus of the type used in distillation and absorption systems for mass transfer exchange between two fluids of differing masses. According to the present invention, there is provided a fluids contacting column, tray opening, fluid dispersing apparatus with a cover plate having at least one bleed fluid perforation. The cover plate is positioned over the tray opening to provide a fluid escape passage between the cover plate and a tray deck surface. Lighter fluid flows upwardly through the tray opening between the tray deck and the cover plate while heavier fluid flows across the tray deck surface.

For the at least one fluid perforation, a bleed fluid deflecting member spans the fluid perforation from both side-to-side to provide at least two oppositely facing outlets. The configuration of the deflecting member disperses the fluid into two distinct bleed fluid streams which flow away from one another and passes over a central zone of the cover plate. These two bleed fluid streams are different in size from the fluid that passes between the cover plate and the tray deck at the fluid escape passage.

In some embodiments of the present invention, the apparatus is a valve assembly and the cover plate rests over the tray thereunder by means of slidable legs. At least two legs are provided to slide in and extend downwardly in the tray opening. For each leg, at least one tray engaging projection is provided on that leg to limit the upward displacement of the cover plate when the upwardly flowing vapor pressure pushes against the cover plate. This defines fluid escape passages between the cover plate and the tray deck.

In other embodiments of the present invention, at least two perforations are provided and the legs are at positions that lie between the perforations but are spaced outwardly therefrom, on the cover plate.

The or each bleed fluid deflecting member may be a hump bridge over the fluid opening.

The or each hump bridge may be a portion of the cover plate which has been formed by providing pairs of parallel slits in the cover plate and upwardly pressing the portion of the cover plate between the slits to provide the perforation there/below leading to the oppositely facing outlets on each side thereof. Three perforations with deflecting members may be provided, and in plan view, they may be arranged in a V-formation around the center of the cover plate with the deflecting member hump bridges extending along parallel, spaced paths. The cover plate legs may be along paths which extend from the center of the cover plate, between the three deflecting members. The or each deflecting member may be a portion of the cover plate which has been formed by providing pairs of parallel slits in the cover plate and upwardly pressing portions of the cover plate on the outer sides of the or each pair of parallel slits to provide the perforations there/below leading to oppositely facing outlets on each side thereof.

The valve assembly of the present invention provides for a finer dispersion of the lighter fluid over a traditionally inactive area of the valve assembly. This provides for a greater effective active area than conventional tray assemblies which rely on traditional valve configurations thereby increasing the efficiency of the mass transfer and thus, lowering the energy requirements. More efficient mass transfer allows for a decreased energy requirement for the entire mass transfer exchange system while increasing the efficiency and maintaining the purity of the desired products.

BRIEF DESCRIPTION OF THE DRAWINGS

In the accompanying drawings which illustrate, by way of example, embodiments of the present invention.

DESCRIPTION OF THE PREFERRED EMBODIMENTS

Figure 1:
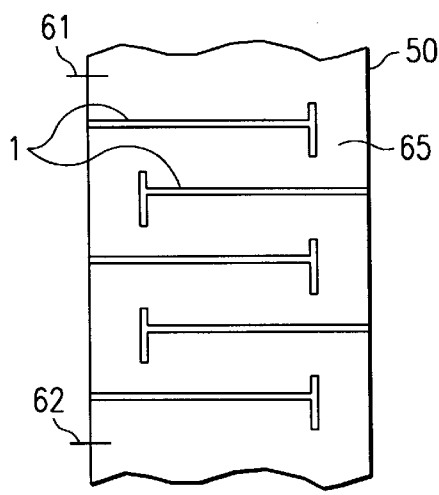
FIG. 1 is a simplified, schematic of a mass transfer exchange column of the present invention showing horizontal tray decks connected to downcomers within the column.

The following descriptions of FIGS. 1 to 12 describe preferred embodiments of the invention. The dispersion tray valve of the present invention is illustrated but is not limited to this embodiment. The descriptive language used both in the specification and claims is for the purposes of clarity and convenience and not with any purpose of implied limitation to mass transfer art, or to a vertical disposition of parts as is usually the case within a mass transfer exchange tower column.

The term "fluid" is adopted from the terminology of mass transfer applications, in order to describe generally, without restriction to mass transfer technology, the kind of particulates that would flow through the valve of the present invention. The particulates in mass transfer operations generally consist of droplets or bubbles at the molecular level or on a microscopic scale. Typically, "vapor" or "gas" is a lighter fluid and "liquid" is a heavier fluid. The dispersion tray valve of the present invention is ideally utilized in a high fluid pressure environment, such as in a trayed tower column. This high fluid pressure environment allows for the separation or fractionation of vapors, gases and liquids.

The terms "tray" and "tray deck" refer to the surface within a tower column used in mass transfer applications. The tray may also be described as a fluid contacting fractionation tray. In a typical tray installation, the upper surface of the tray is toward the top of the tower and the lower surface of the tray is toward the bottom of the tower. Many different trays may be contained within a trayed or fractionation column. Several tray openings are positioned throughout the tray deck surface. Ordinarily, valves or other devices are positioned above the tray openings to regulate the flow of vapors through the liquids. However, the term tray herein means simply any surface through which a valve, such as in the present invention, is mounted.

The valve assembly or other device of the present invention may be constructed to fit within the mass transfer fractionation trays. The dispersion tray valve is illustrated, described and claimed, generically and in preferred specific embodiments.

The valve assembly or other device of the present invention is preferably inserted into the openings of the trays for use in a tower column and fluid environment. However, it is not intended to restrict the application of the invention to a valve for use in only a fluid environment or a tower column.

Throughout the specification and claims, reference is made to "movable" as generally describing the movement of the tray valve when inserted into the tray deck and opening. In general, the valve assembly or other device of the present invention preferably moves in an upward and downward motion relative to the tray deck. This movement allows for the fluid to pass from one side of the tray deck to the other side to accomplish the fractionation of fluids required by mass transfer technology. The distance between the tray deck and the dispersion valve defines a fluid escape passage or opening where upwardly flowing particles pass through.

Figure 2:
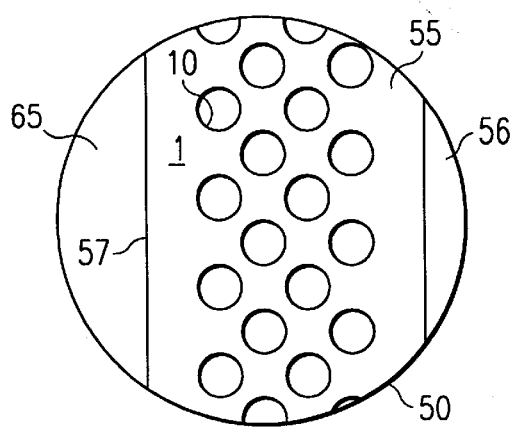
FIG. 2 is an overhead view of a horizontal tray deck.

Referring to FIGS. 1 and 2, there is shown, in simple schematics, a vertical oriented tower or column 50 and an above view of a tray deck 1. A number of tray decks 1 are horizontally spaced apart and mounted within column 50. Liquid is fed to the uppermost tray deck by a fluid line 61 at an upstream end 56 of the tray deck. Downcomer passages 65 lead down from one tray deck to the next lower tray deck at downstream end 57. A lighter fluid or vapor is introduced at the bottom of the tower through feed line 62. As the heavier liquid flows across the tray deck surface 1, the vapor ascends through the openings 10 in the tray to create a bubble or active area 55. In the active area 55, intimate and active contact occurs between the heavier fluid and lighter vapor.

Figure 3:
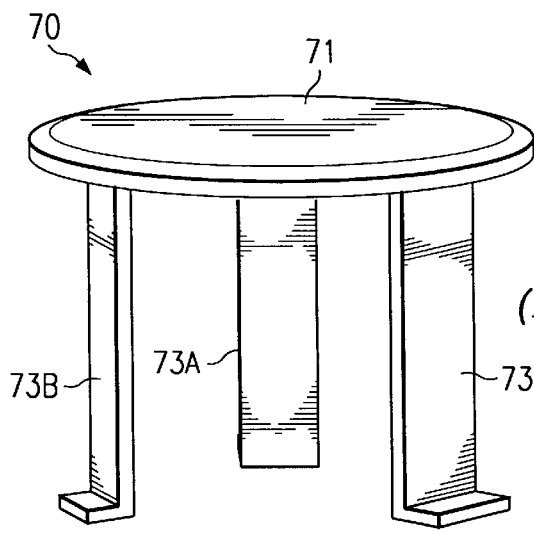
FIG. 3 is a corner view of a conventional, prior art valve device used in the horizontal tray decks.

FIG. 3 shows a prior art valve assembly 70 of conventional construction. Valve assembly 70 is mounted in openings 10 of the tray deck 1. The valve 70 includes a non-perforated cover plate 71 with legs 73, 73A and 73B to allow the valve to be mounted within tray deck 1.

Figure 4:
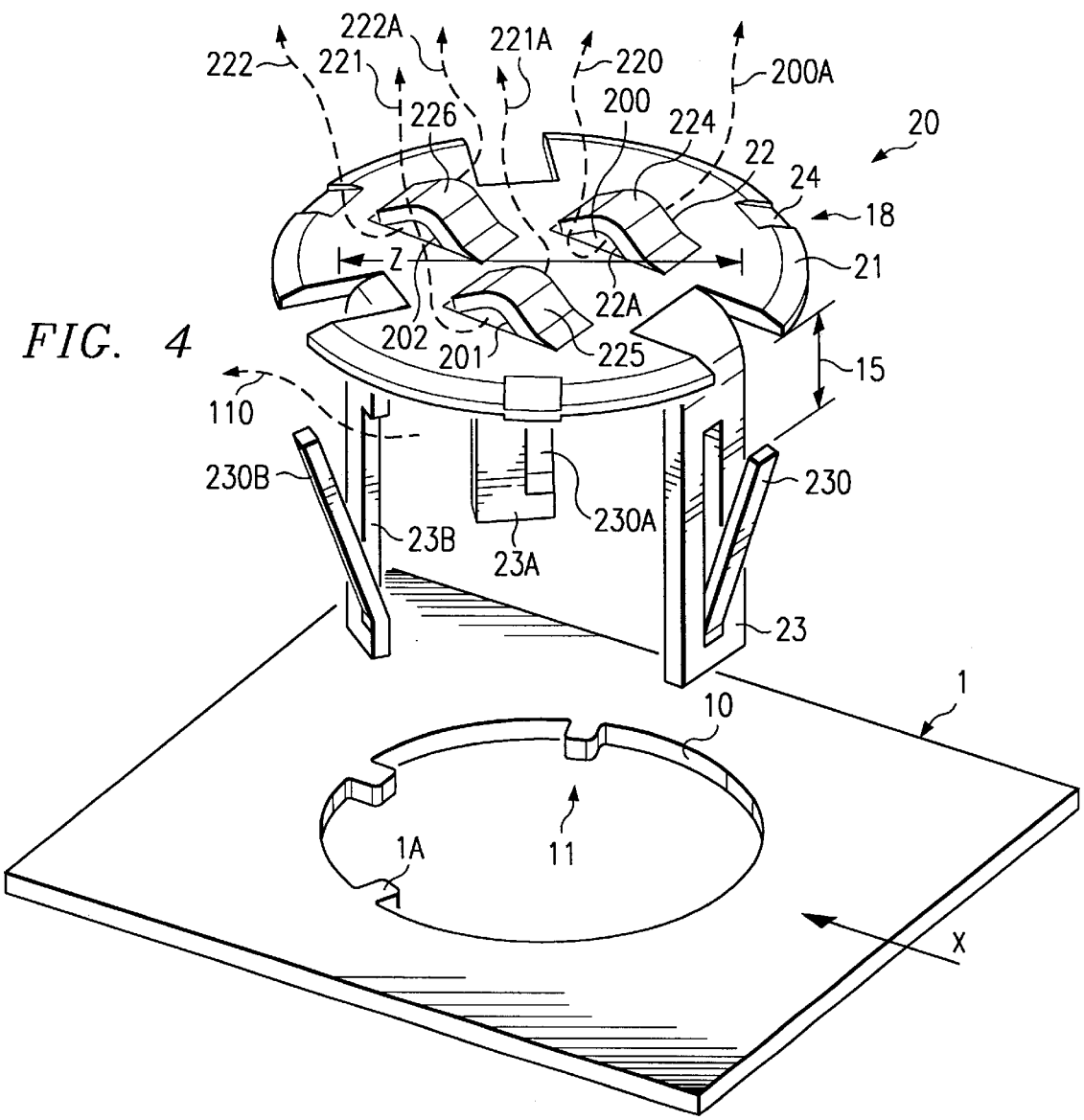
FIG. 4 is an exploded isometric view of a movable valve and tray for providing a valve tray assembly of the mass transfer exchange column of FIG. 1.
Figure 5:
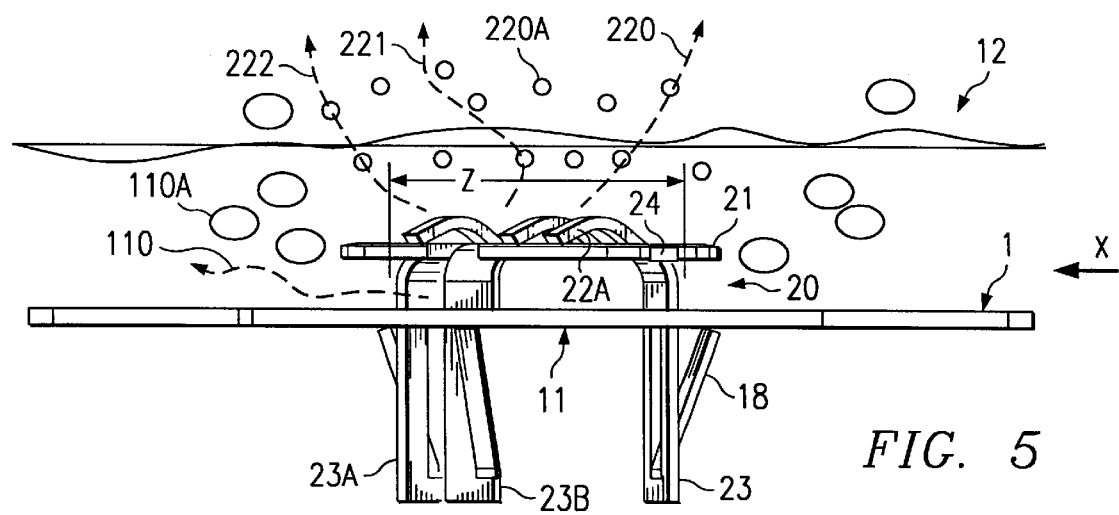
FIG. 5 is a side view of FIG. 4 with the movable valve inserted into in the tray of FIGS. 1 and 2.

Referring to FIGS. 4 and 5, there is shown, a fluids contacting column, tray opening 10, fluid dispersing assembly, generally designated 18, comprising:

a. a bleed fluid perforation, 200, 201 and 202, containing cover plate 21, for the tray opening 10 of tray 1;

b. downwardly extending cover plate legs, 23, 23A and 23B, for, in operation, supporting and positioning the cover plate 21 over the tray opening 10 and providing escape passages, such as that designated 110, between the cover plate 21 and the tray deck 1 for fluid 11 flowing upwardly through the opening 10;

c. for the or each perforation, 200, 201 and 202, a bleed fluid deflecting member, 224, 225 and 226 respectively, spanning the perforation 200, 201 and 202, from side-to-side to provide at least two oppositely facing outlets, such as those designated 22 and 22A therefrom and such as those designated 22 and 22A therefore, which in operation, will form at least two distinct bleed fluid streams, 200/200A, 221/221A and 222/222A, flowing away from one another over a central zone Z of the cover plate 21; and d. whereby the bleed fluid deflecting members 224, 225 and 226 contact the lighter fluid streams 200/200A, 221/221A and 222/222A to disperse the fluid streams into finer fluid streams than the fluid stream 110/110A passing through the fluid escape passages 20.

In this embodiment of the present invention, the assembly 18 is a valve assembly and the cover plate 21 rests on the tray over the opening 10 thereunder, the legs 23, 23A and 23B are slidable, in and extending downwardly in the tray opening 10, and, for each leg 23, 23A and 23B, at least one tray engaging projection, 230, 230A and 230B respectively, is provided on that leg 23, 23A and 23B for limiting cover plate upward displacement, by upwardly flowing fluid, to reveal the escape passages such as that designated 20.

Figure 6:
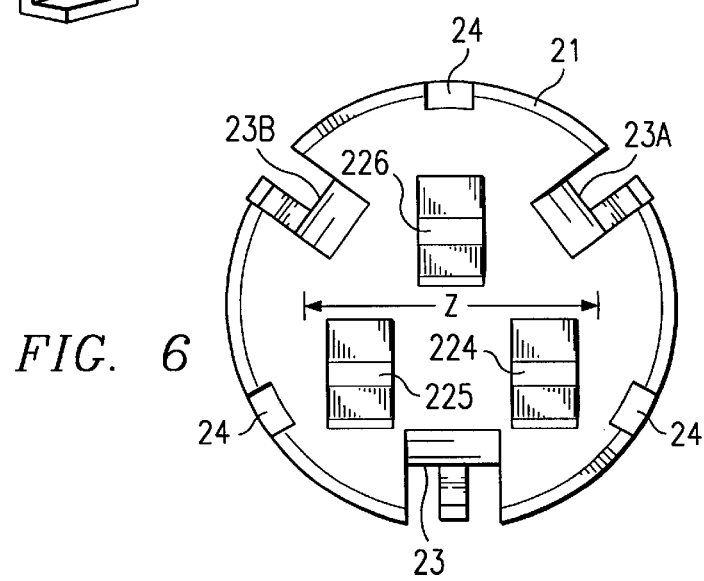
FIG. 6 is a above, top view of the valve assembly of FIGS. 4 and 5 showing the perforations and deflecting members.

In this embodiment of the present invention, three perforations 200, 201 and 202, are provided, and the legs, 23, 23A and 23B, are at positions that lie between the perforations, 200, 201 and 202, but are spaced outwardly therefrom, on the cover plate 21. As shown in FIG. 6, the bleed fluid perforations are arranged in a V-shaped formation such that the fluid streams pass over a traditionally inactive and central area of the valve Z.

The legs 23, 23A and 23B prevent lateral displacement of the cover plate 21 over the tray 1.

The valve assembly 18 is made from a material, preferably metal, that will be suitable for the fluids contacting application with which the column (not shown) is intended to be used. The valve may be constructed of other materials such as plastics when the valve assembly is to be used in mass transfer applications when the fluids do not interact with the plastic. Valves constructed of plastic lower the cost of the equipment for the column.

In the embodiment of the present invention, the cover plate 21 is circular, for covering a circular opening 10, and the three legs 23, 23A and 23B, are integral therewith. The legs are circumferentially spaced therearound at approximately 120 degrees from one another to lie along paths that extend from the center of the cover plate 21, between the deflecting members 224, 225 and 226. Preferably, legs 23A and 23B are closer than 120 degrees apart to allow for the a greater spacing between the deflector members.

The tray engaging projections 230, 230A and 230B are described in Provisional Patent Application, Ser. No. 60/061,504, filed Oct. 10, 1997 by Karl T. Chuang entitled "Method and Apparatus for Tray Valve Attachment"; the complete disclosure of which is incorporated herein by reference. Two types of tray engaging projections are shown, which are:

i). tray engaging projection 230 which is a central tongue portion of leg 23 formed from an inverted, elongated, u-shaped cut portion of the leg 23 which has been bent to extend outwardly therefrom in an upward direction, preferably at an acute angle; and ii). tray engaging projection 230A which is a side tongue portion of leg 23A formed from an inverted, L-shaped cut portion of the leg 23A which has been bent to extend outwardly therefrom, in an upwardly direction, preferably at an acute angle.

The distance 15 between the upper end of the tray engaging projection 230 and the cover plate 21 determines the maximum height of the escape passage 110 when the cover plate 21 is fully displaced by being floated upwardly by lighter fluid to the position shown in FIG. 5.

The tray opening 10 may be provided with at least one anti-rotation tab, such as that designated 1A, FIG. 4. The tab 1A protrudes slightly inwardly, radially from the perimeter of the tray opening 10 so that when leg 23 is in the opening 10 rotation of the cover plate 21 in the opening 10 is restricted. This facilitates a more uniform passage of fluid through all of the escape passages, such as that designated 110, and ensures a more predictable fluid flow rate calculations to be made to achieve higher efficiency.

Anti-sticking tabs, such as that designated 24 in FIGS. 4, 5 and 6, protrude slightly downwardly form the cover plate 21. The tabs 24 ensure that there is always a gap between the underside of the cover plate 21 and the tray 1. This avoids the cover plate 21 becoming completely suction attached to the tray deck 1 during use so that the cover plate 21 may be floated.

In the embodiment shown in FIGS. 4 and 5, the bleed fluid deflecting members 224, 225 and 226 may be described as hump bridges, sun roof projections or canopies providing bleed fluid openings, such as those designated 22 and 22A on opposite sides of the bleed fluid deflecting members 224, 225, and 226. The three bleed fluid deflecting members 224, 225 and 226 when viewed from above are in a V-formation around the center of the cover plate 21, and extend upwardly over in and span the perforations 200, 201 and 202 from side-to-side, along parallel, spaced paths, and may be provided by cutting parallel slits in the cover plate 21 and either upwardly pressing the portion of the cover plate 21 between the slits by stamping, pressing or molding, an upwardly curved bridge or canopy to provide the perforations 200, 201 and 202, with the bleed fluid deflecting members 224, 225, and 226 spanning them.

In other embodiments of the present invention, the tray opening 10 and the cover plate 21 including the perforations 200, 201 and 202 may be other geometric shapes such as round, square or triangular. While three perforations 200, 201 and 202 are provided in this embodiment, the number, size and configuration of the perforations and the bleed fluid openings, such as those designated 22 and 22A, will be determined by the size of the openings 10 in the tray 1, and the dispersed fluid dispersion effect desired.

In operation, a relatively heavier fluid stream flows over the top of the tray 1, in the direction of arrow X, while a relatively lighter fluid 11 flows upwardly through the opening 10 (FIG. 4) lifting the assembly 1 to reveal the escape passages, such as that designated 110. A portion of the lighter fluid 11 passing through the opening 10 escapes as streams of relatively large droplets or bubbles 110 and 110A from the fluid escape passages 20, such as that designated 10, into the heavier stream, while another portion thereof passes upwardly through the perforations 200, 201 and 202 to be deflected by the deflecting members 224, 225 and 226, as two emerging streams of relatively finer bubbles, 220 and 220A into the heavier streams, from the oppositely facing outlets, such as those designated 22 and 22A.

The streams of finer bubbles 220 and 220 A flow in opposite directions, away from one another, form the outlets, such as those designated 22 and 22A, over the cover plate 21 before ascending through the heavier liquid. This flow pattern of the finer bubbles 220 and 220A i). directs finer bubbles 220 and 220A into portions of the heavier fluid in the central zone Z of the cover plate, which would otherwise be stagnant, that is, free of bubbles of lighter fluid of any size, and ii). Provides greater surface area contact between the lighter and heavier fluids.

These two features increase the assembly 18 and tray 1 efficiency thus lowering operation costs by increasing the contact efficiency when compared with conventional assembly and tray designs. Put another way, there is a greater enhanced and uniform interaction between the lighter and heavier fluids without the need for an increase in the number of assemblies 18, when compared with conventional assemblies and trays.

The following tests were made to verify the present invention using the assembly shown in FIGS. 4 and 5 and the conventional valves shown in FIG. 3.

TEST I

In this test, isopropyl alcohol liquid was pumped upwardly, as the lighter fluid, through a column containing the tray while methyl alcohol liquid was passed downwardly through the column, as the heavier fluid, to flow across the tray. This was done for the fractionation of methanol from the isopropanol and methanol mixture at various flow rates as defined by F-factor from 0.8 to 2.8 (kg/m)**0.5/s under a constant reflux flow conditions.

Figure 7:
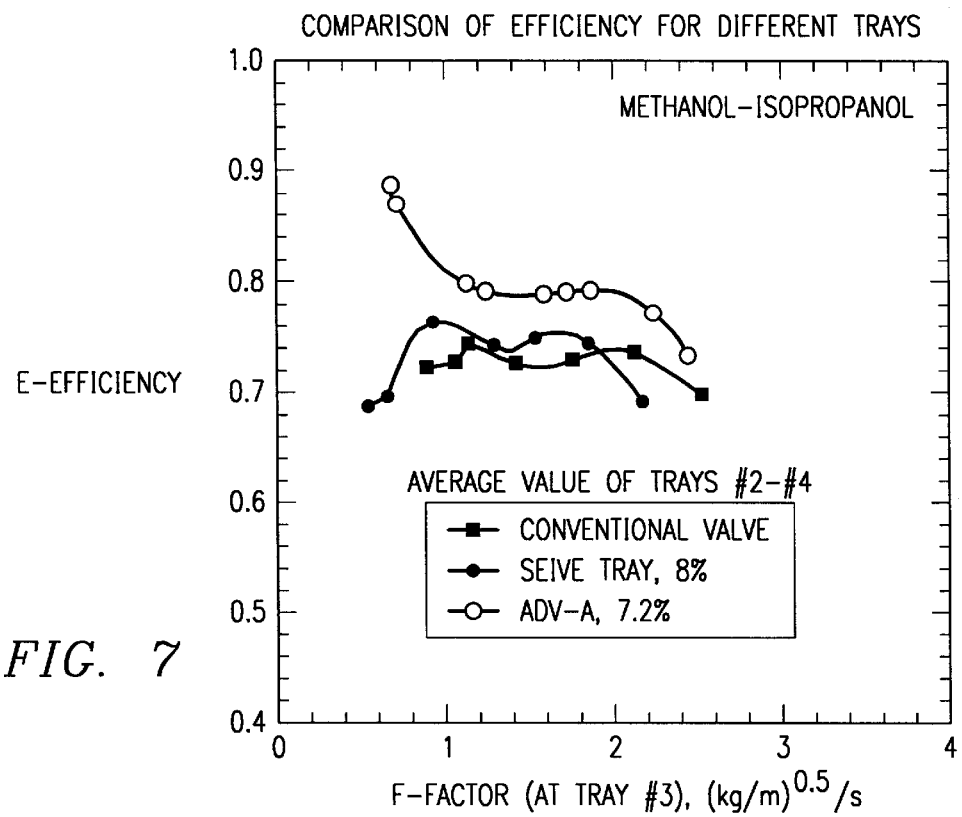
FIG. 7 is a graph showing test results of the efficiency of the assembly shown in FIGS. 4 and 5 compared to the efficiencies of conventional valve device in FIG. 3, FIGS. 8 and 9 are graphs showing test results of the entrainment (liquid transported by the gas to the tray above/ vapor carrying liquid droplets) of the heavier fluid in the lighter fluid, using the assembly shown in FIGS. 4 and 5 and conventional valve devices shown in FIG. 3.

Referring now to FIG. 7, where F represents various vapor flow rates, reading from left to right, while E represents the fractionation efficiency of the methanol from the mixture. In FIG. 7, -●- represents a conventional sieve tray with 8% of the tray surface area perforated, -■- represents the conventional valve tray having non-perforated cover plates, and -○- represents the tray according to the present invention with a cover plate having perforations and deflecting members as shown in FIGS. 4 and 5.

As will be seen from FIG. 7, the valve assembly of FIGS. 4 and 5 offers approximately a 10% increase in efficiency over the conventional tray with valve assemblies as shown in FIG. 3 at the normal operating range of the flows tested.

Figure 8:
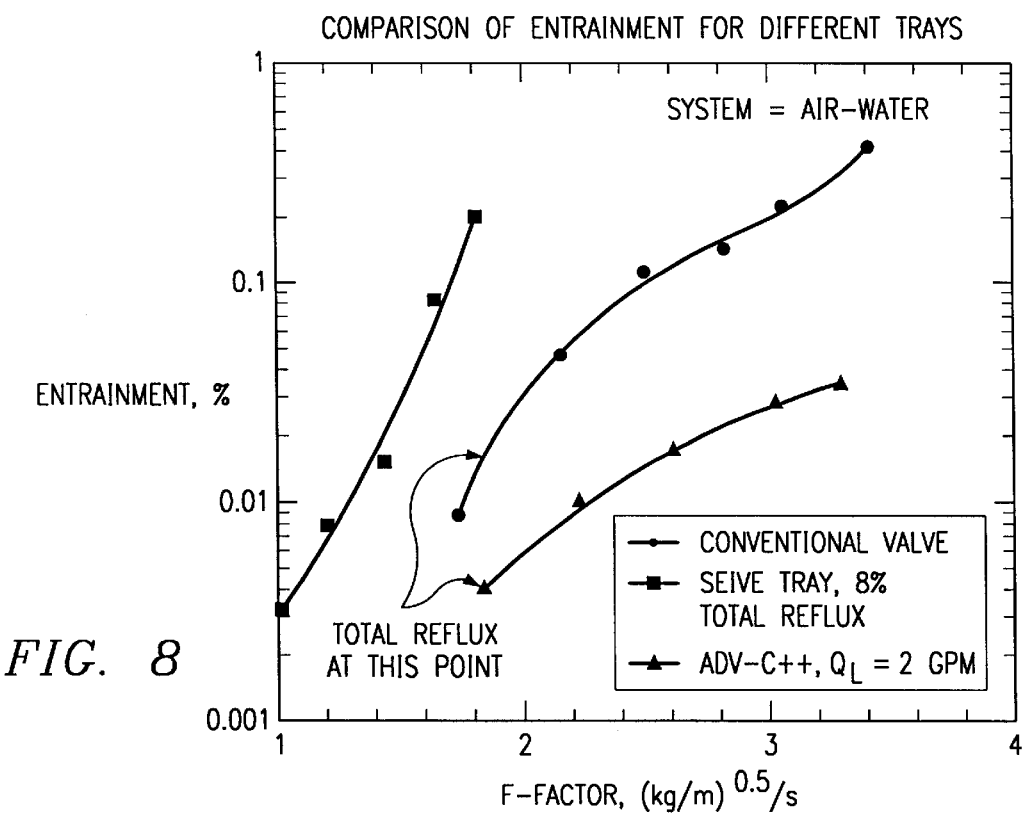
Figure 9:
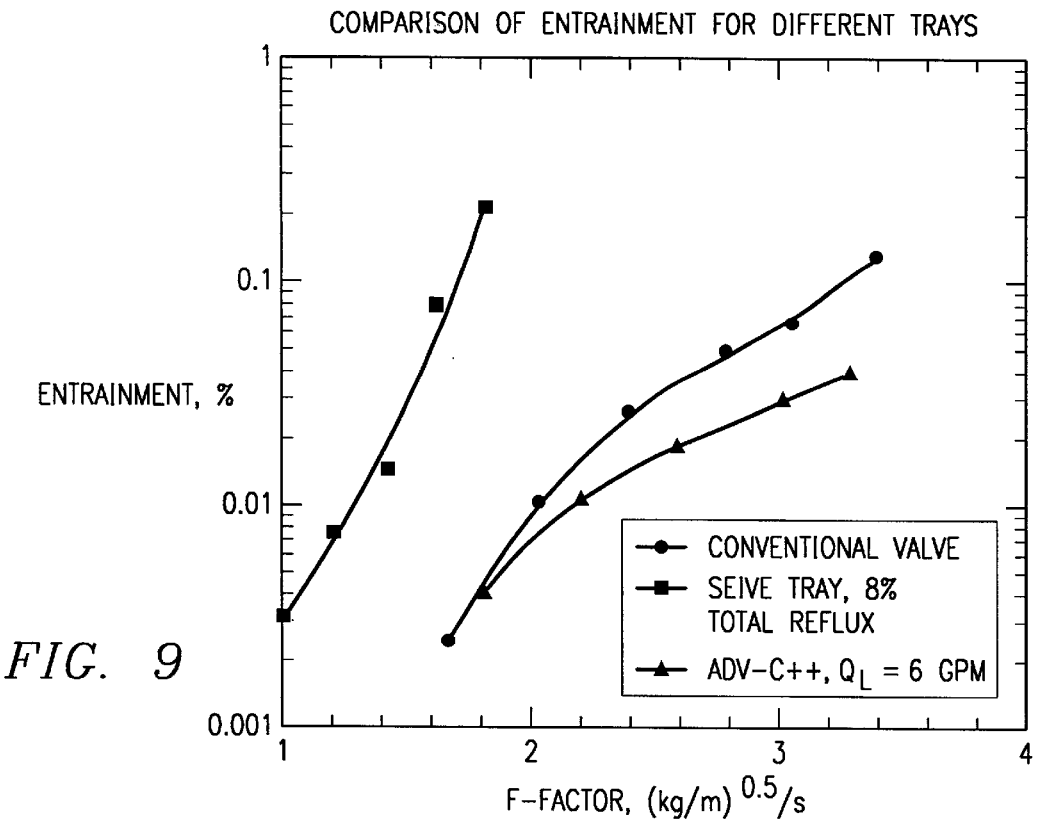

Referring now to FIGS. 8 and 9, which show entrainment comparisons for air flowing upwardly as the lighter fluid, and water flowing downwardly as the heavier fluid.

As will be seen from FIGS. 8 and 9, the assembly of FIGS. 4 and 5 incur much lower liquid entrainment of the gas and higher gas volume handling capacity than conventional trays.

Figure 10:
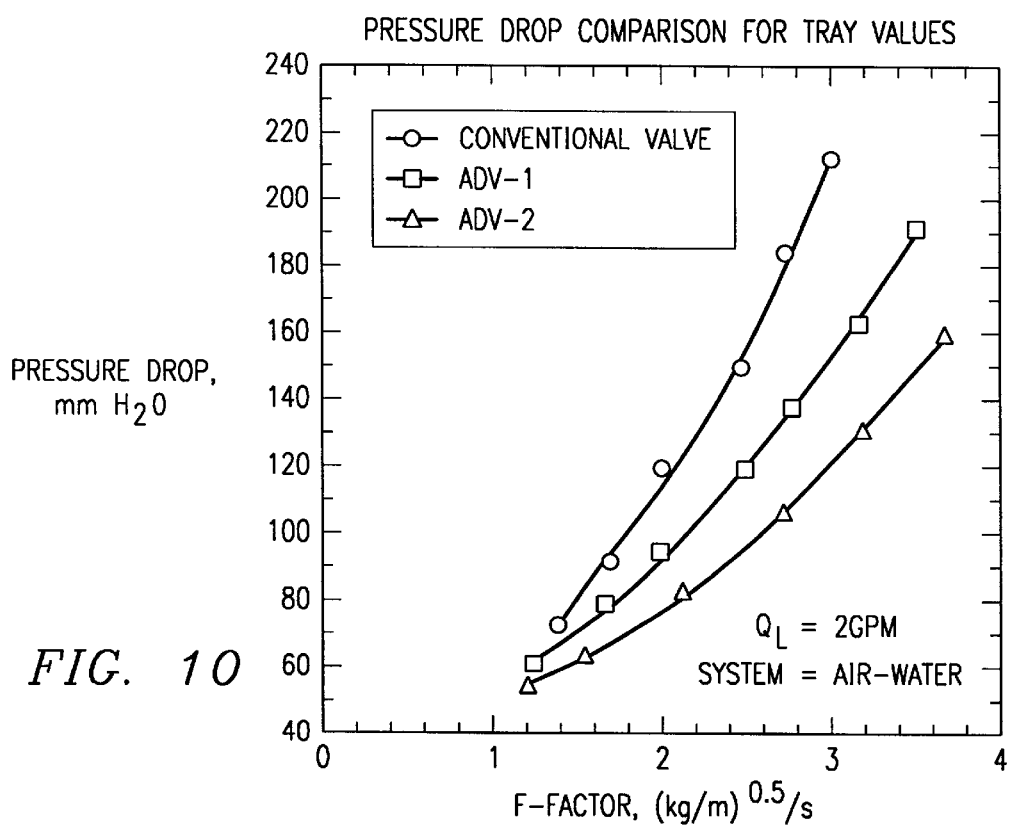
FIGS. 10 and 11 are graphs showing the pressure drop of heavier fluid using, the assembly shown in FIGS. 4 and 5, and conventional valve devices shown in FIG. 3.
Figure 11:
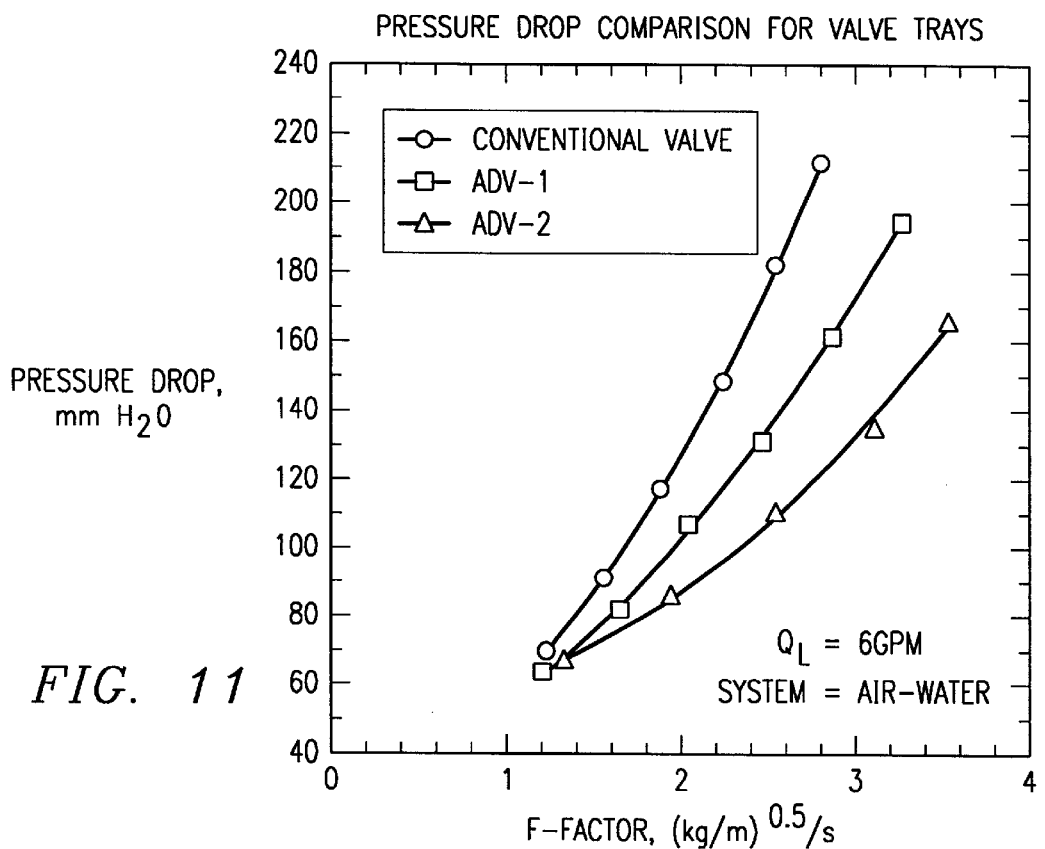

Referring now to FIGS. 10 and 11 which show pressure drop comparisons for the water flowing downwardly in the air/water systems of FIGS. 8 and 9.

As will be seen from FIGS. 10 and 11, the water pressure drop for the assembly shown in FIGS. 4 and 5 is approximately 10 to 20% lower than those of conventional valve assemblies of FIG. 3, depending on the flow rates of the fluids. The assembly as shown in FIGS. 4 and 5 was found to be able to provide a greater escape over the lighter fluid to pass upwardly through a tray than that of conventional trays.

Figure 12:
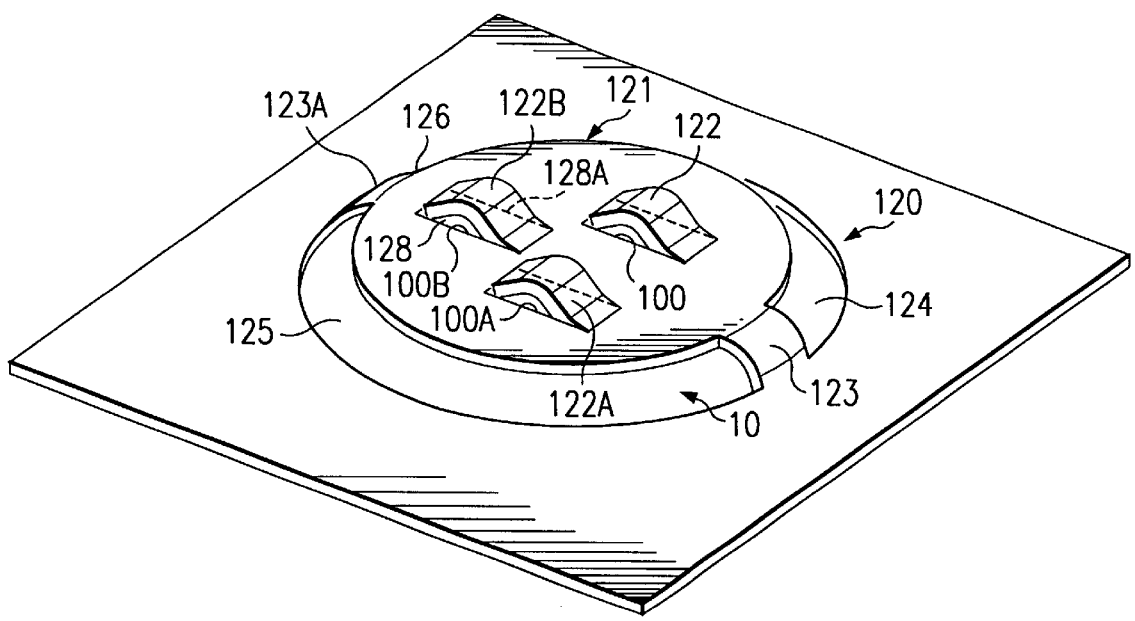
FIG. 12 is a corner view of a fixed, fluid dispersing assembly and tray of a mass (transfer) exchange column.

Referring now to FIG. 12, where similar parts to those shown in FIGS. 4 and 5 are designated by the same reference numerals and the previous description is relied upon to describe them, there is shown a fixed, fluid dispersing assembly generally designated 120 in tray 1.

A cover plate 121 is attached to the tray 1 by three downwardly extending cover plate legs, two of which are shown and designated 123 and 123A. The legs such as 123 and 123A are spaced equidistant from one another around the cover plate 121, and secure the cover plate 121 in a fixed, raised position over opening 10 in the tray 1 to provide escape passages 124 to 126, between the tray 1 and cover plate 121, for upwardly flowing fluid through the opening 10.

Three bleed fluid perforations 100, 100A and 100B are provided in the cover plate 121, each having a bleed fluid deflecting member 122, 122A and 122B, respectively, spanning that perforation 100, 100A and 100B, to provide oppositely facing outlets, such as, 128 and 128A.

The cover plate 121, legs such as 123 and 123A, and members 122, 122A and 122B may be integral with the tray deck and pressed therefrom. In other embodiments, the cover plate 121, legs such as 123 and 123A, and members 122, 122A and 122B may be integral, and pressed from sheet, mounted in the tray 1 by springing the legs into the opening 10 until projections (not shown) secure the cover plate 121 at a fixed height over the opening 10.

In operation, the assembly shown in FIG. 12 operates in the same manner as that described with reference to FIGS. 4 and 5, except that the cover plate 121 is fixed in position over the opening 10 and is not lifted by the relatively lighter fluid.

While the invention has been described with respect to its preferred embodiments, other, different constructions can be used. For example, the perforations with deflecting members may be incorporated into any other configurations of valve cover plates or caps such as square, rectangular, triangular or other shapes as required by the specifications of the tower. Also, different shapes and numbers of perforations and deflecting members may be incorporated into various valves. Moreover, the perforations with the deflecting members may be incorporated into various valves. Moreover, the perforations with the deflecting members may be adapted and used with other traditional valve designs such as other floating valves and other fixed valves such as bubble caps to increase the surface area contact between the lighter and heavier fluids and produce finer fluid droplets and bubbles as needed.

These and various other modifications can be made to the disclosed or other embodiments without departing from the subject of the invention.

What is claimed is:

1. A fluids contacting column, tray opening, fluid dispersing apparatus, comprising:

a cover plate for the tray opening, said cover plate containing at least one bleed fluid perforation;

means for positioning the cover plate over the tray opening thereby, in operation, providing fluid escape passages between the cover plate and a tray deck for a fluid stream flowing upwardly through the tray opening;

for the at least one bleed fluid perforation, a bleed fluid deflecting member spanning the bleed fluid perforation from side-to-side to provide at least two oppositely facing outlets such that at least two distinct and substantially coplanar bleed fluid streams flow away from one another over a central zone of the cover plate;

said each distinct bleed fluid stream differs in size from the fluid stream flowing upwardly through the fluid escape passages; and the apparatus is a movable valve assembly and the means for positioning said cover plate over the tray opening thereunder comprise at least two legs, said legs being slidable, in and extend downwardly in the tray opening, and, for each leg, at least one tray engaging projection is provided on that leg for limiting cover plate upward displacement, by upwardly flowing fluid, to reveal the fluid escape passages.

2. The apparatus according to claim 1, wherein said each bleed fluid stream is finer than the fluid flowing upwardly through the fluid escape passages when the valve assembly is in an extended position.

3. The apparatus according to claim 2, wherein three perforations with deflecting members are provided, and when viewed from above are arranged in a V-formation around the center of the cover plate with the fluid deflecting members with hump bridges extending along parallel, spaced paths whereby each fluid deflecting member forms two distinct bleed fluid streams flowing away from one another toward a central zone of the cover plate for each respective fluid perforation.

4. A method of increasing the efficiency of and providing a greater effective active area for fluid interaction in a mass transfer exchange system, said method comprising:

providing a valve assembly having a cover plate and means to position the cover plate over a tray opening in a tray deck of said mass transfer exchange system to define a fluid escape passage between the cover plate and the tray deck;

perforating said cover plate of the valve assembly to form at least one bleed fluid perforation in the cover plate;

forming an integral deflecting member over said bleed fluid perforation which is substantially and geometrically identical to its respective perforation to create at least two opposed and substantially coplanar bleed fluid streams such that a finer fluid flow is dispersed through the fluid perforation than a fluid flow through the bleed fluid escape passage;

dispersing and directing said finer fluid flow toward a central portion of said cover plate; and said means for positioning the cover plate over the tray opening is by providing at least two legs which are integral with the cover plate and slidable within the tray opening.

* * * * *